Jan. 12, 1926. 1,569,342
A. VERNES ET AL
ABSORPTION AND DIFFUSION PHOTOMETER
Filed Sept. 25, 1923  3 Sheets-Sheet 2

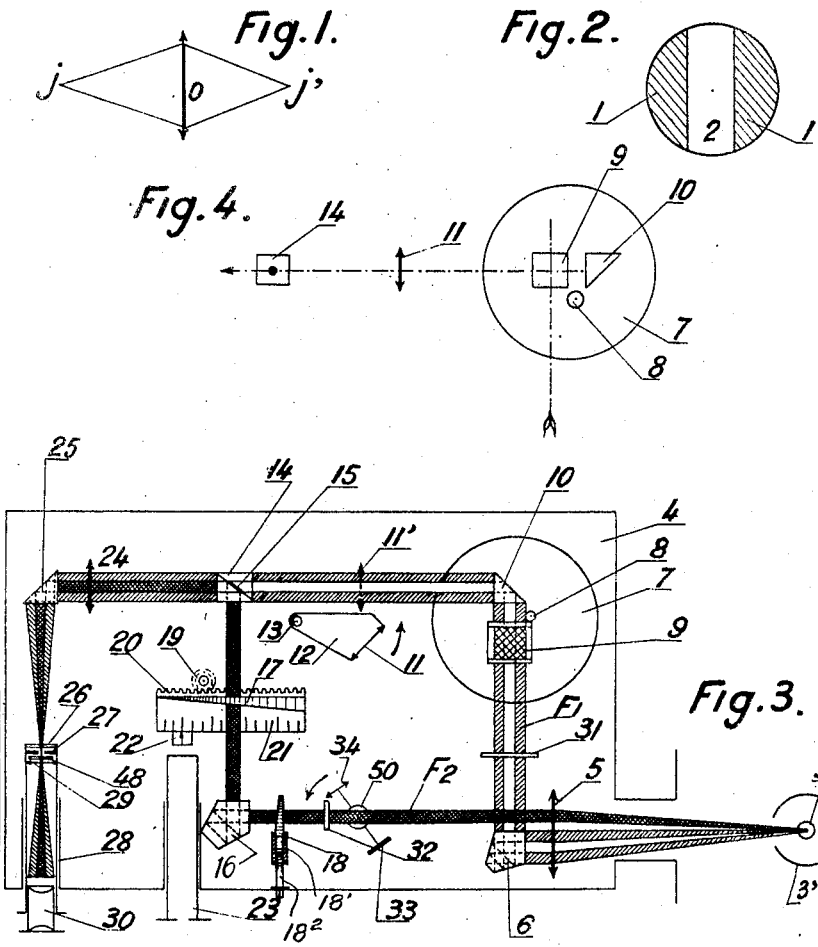

Inventors
A. Vernes
R. Bricq
M.L.A. Jobin
G.C.J. Yvon
By Marks & Clerk Attys.

Patented Jan. 12, 1926.

1,569,342

UNITED STATES PATENT OFFICE.

ARTHUR VERNES, ROBERT BRICQ, MARIE LOUIS AMÉDÉE JOBIN, AND GUSTAVE GEORGES JOSEPH YVON, OF PARIS, FRANCE.

ABSORPTION AND DIFFUSION PHOTOMETER.

Application filed September 25, 1923. Serial No. 664,787.

*To all whom it may concern:*

Be it known that we, ARTHUR VERNES, a citizen of the French Republic, residing at 30 Bd. Arago, Paris, France, ROBERT BRICQ, a citizen of the French Republic, residing at 30 Bd. Arago, Paris, France, MARIE LOUIS AMÉDÉE JOBIN, a citizen of the French Republic, residing at 31 Rue Humboldt, Paris, France, and GUSTAVE GEORGES JOSEPH YVON, a citizen of the French Republic, residing at 31 Rue Humboldt, Paris, France, have invented certain new and useful Improvements in Absorption and Diffusion Photometers, of which the following is a specification.

Photometers of the absorption type are already known, chiefly under the name of opacimeters, which serve to determine the opacity of a substance which is not entirely transparent, in order to estimate the quantity or mass of particles suspended in a liquid, for example, the size of the particles being supposed to have been determined by experiment.

Such apparatus are based upon the observation of two adjacent photometric spots or regions illuminated by two beams whereof one traverses the absorbent substance under test and the other is acted upon by a suitable reducing device adapted to diminish the intensity of the beam at will and in a known manner, so as to obtain equal values for the two photometric spots observed.

Diffusion photometers are in use, particularly known as nephelemeters, which serve for the observation of the light diffused by a cloudy liquid, in order to estimate the quantity or the mass of particles in suspension should the size of the particles be properly ascertained, or on the contrary to estimate their size where the quantity or mass is known. Such apparatus are also based upon the observation of two adjacent photometric regions whereof one is illuminated by the light diffused by the substance under test and the other by the light diffused by a standard substance, one of these illuminations being controlled by a reducing device. In all the said apparatus, the direction of observation is perpendicular to the direction of the beam which is directed upon the diffusing substances (diffusion at a fixed angle of 90 degrees).

The present invention relates to an apparatus which combines in a very simple manner the measurements of absorption and of diffusion by using a common source of light for these two measurements as well as a common reducing device and common observing elements.

The said apparatus is based upon the principle that if two variables are under consideration, i. e. the quantity or mass of the particles in suspension and their size, two separate factors must be obtained. Our said apparatus provides for the obtainment of these two factors in a rapid and exact manner and in reliable conditions of comparison, such as the observation of a common liquid container at the same temperature and at the same instant. The two factors can also be checked by measurements of diffusion at angles other than 90 degrees.

Our apparatus is susceptible to many uses, and in particular it is of value in syphilimetry, i. e. for the diagnostic and the measurement of the syphilitic infection, in which it is necessary to determine the degree of opacity of the cloudy substances and also to standardize the said substances with reference to one another or to standard opalescent bodies.

In the appended drawings:

Figs. 1 and 2 are diagrams explaining the principle of photometry which is herein employed.

Fig. 3 is a general plan view of the apparatus as arranged for an absorption measurement.

Fig. 4 shows a portion of the apparatus as arranged for a measurement of diffusion at a 90 degrees angle.

Figs. 5 and 6 are respectively plan and elevational views showing the disposition of certain elements of the apparatus for diffusion measurement at an angle other than 90 degrees.

Figure 7:
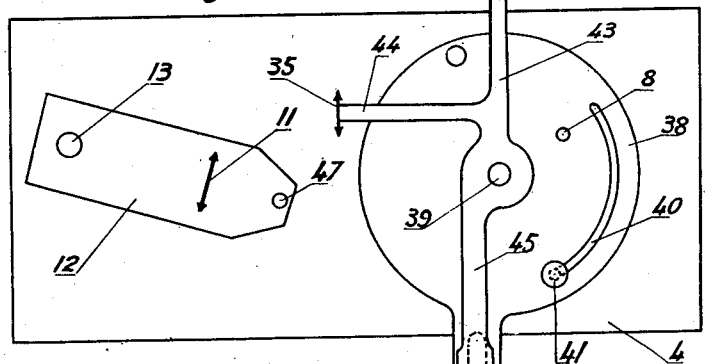
Figs. 7, 8 and 9 are plan views showing three different positions of the manipulating device using a single knob in order to place the desired elements in position for any one of the three measurements as stated.

The fundamental principle which we utilize is that of beams which are directed by a screen without diffusion, this principle having already been used for tests upon illuminants or upon absorption. J, Fig. 1, represents an illuminant and J' the region corresponding to the same as produced by the lens O. The principle consists in placing the eye at J' at which point the beam from J converges and in taking as a photometric region a uniformly illuminated section of the beam converging at J'. By extension, the eye may be placed in the region conjugated of J through a complex optical arrangement of any suitable nature.

The section of the beam chosen to form the said region is the one in which is disposed a photometric cube 14 (Fig. 3), having one or more regions, for instance a cube of the Lummer and Brodhun type with three regions, having at the center of one of its diagonals a suitable reflecting surface. In these conditions, the two outer regions 1, Fig. 2, are illuminated exclusively by a beam $F^1$ (see Fig. 3) traversing the cube outside of the silvered surface, whilst the central region 2 is illuminated exclusively by a beam $F^2$ which is in the first place perpendicular to the second beam and is then reflected from the silvered surface of the cube.

In observations upon absorption, the beam $F^1$ and $F^2$ are obtained by the separation of an initial beam proceeding from the single illuminant. The first beam traverses the substance under test, whilst the second beam traverses the reducing device.

When making observations upon diffusion, the beam $F^1$ proceeds from the secondary illuminant constituted by the diffusing body under test. The beam $F^2$ is the same as for the absorption tests, or if desired it may proceed from the secondary illuminant constituted by a standard diffusing body.

The apparatus, Fig. 3, comprises a light-tight box from which the beam emerges from the illuminant 3, which is enclosed in an opaque bell 3'. The several observation and control elements are mounted upon the bottom or base 4 of said box. The beam from 3 proceeds upon a collimation objective 5 and issues thence as a parallel beam. One part is reflected from the pentagonal prism 6 in the perpendicular direction, and thus forms the beam $F^1$, whilst the second part continues upon its path and constitutes the beam $F^2$.

In the path of the beam $F^1$ is disposed a base or disc 7 pivoting on an axle 8 and having thereon a receptacle or vessel 9 for the liquid under test as well as the totally-reflecting prism 10. The receptacle 9 has the form of a parallelepiped, and its four sides are polished. The beam $F^1$ when reflected in the perpendicular direction will proceed upon the objective 11 mounted upon a base 12 pivoting on the axle 13; the said base may be moved aside and out of the path of the beam $F^1$ if desired. Beyond the said objective is disposed the photometric cube 14 having at the middle of one of its diagonals the reflecting surface 15.

The beam $F^2$ proceeds upon a pentagonal prism 16 and upon a reducing device which may consist of a known arrangement such as crossed Nicol prisms, or otherwise of the following arrangement, comprising a wedge-shaped piece 17 and a corresponding wedge-shaped piece 18 composed of a neutral substance such as black glass or gelatine; the two wedges have the same angle at the apex but are placed in inverse position. They may be disposed as shown in Fig. 3, one before and one after the prism 16; the piece 18 is stationary whilst the piece 17 may be moved lengthwise by means of a milled head operating a pinion engaging the rack 20. As observed, this movement will vary the thickness of the virtual parallel faced element constituted by the pair of wedges and hence will vary the value of the absorption. A graduated scale 21 attached to the piece 17 co-operates with a pointer 22 so as to indicate the value of the absorption in optical density. Reading of the scale is effected by a glass 23 extending outwardly of the instrument case.

The element 18, which is mounted in stationary position when in use, can be given by means of a suitable device, for example a threaded socket $18^1$ movable longitudinally and a threaded rod $18^2$ rotatably mounted in a wall of the box, a small correcting movement which is utilized before making the tests in order to adjust the zero position. This enables the compensation for slight variations in optical density which may occur at various times upon the optical path due to the condition of the surfaces.

After traversing the reducing device, the beam $F^2$ proceeds upon the reflecting surface 15 of the cube 14 and is thence reflected in the perpendicular direction, and from this time onward, the two beams $F^1$ and $F^2$ are combined with one another. The two beams meet with an objective 24 which converges the same, after reflection from the totally reflecting prism 25, in its focal plane 26 near which is placed the diaphragm 27. The photometric images provided by the cube 14—15 are observed by the sighting device which comprises an objective 29, an inner diaphragm (not shown) for outlining the spots, and an eye-piece 30.

The said apparatus is operated in the following manner:

Whatever may be the measurement to be made, such as absorption, 90 degree diffusion, or diffusion at any other angle, the two images of the illuminant formed in the focal plane 26 are to be combined. This is ascertained by an observation with the reading glass 23 which is substituted for the sighting device 28. Should the images not be combined, the operator acts upon the milled heads regulating the cube 14 or the prism 10, or both together, so that he can move each image in the vertical and the horizontal direction. After placing the sighting device 28 in position, the two images thus formed will give definitive images through the said device which will be located on the ocular ring of the pupil of the eye, so that upon observing the regions through the sighting device 28 the operator will see the images of these regions and not the images of the illuminant. A small movement of the eye must not affect the proper estimation of the respective value of the spots, so that the definitive images of the illuminant on the pupil of the eye are to be combined. For this purpose it is simply necessary to combine the two images which are produced upon the focal plane 26. When the operator observes the spots, he acts upon the reducing device 17, 18 so as to equalize the two spots, and he then reads the scale division upon which the reducing device is placed. In order to increase the range of the measurements, we may dispose in the path of the beams $F^1$, $F^2$ the elements 31, 32 consisting of flat plates of a neutral substance which is preliminarily standardized as to opacity or optical density.

With the apparatus thus disposed, should it be desired to make a measurement of absorption, we place in the path of the beam $F^1$ the vessel 9, Fig. 3. The beam proceeds thence upon the total reflection prism 10 and upon the cube 14. The objective 11 is eliminated in the position represented in full lines, Fig. 3. We then operate as above stated, in order to obtain an equal value for the two spots.

To make measurements of diffusion at a 90 degree angle, the base 7 is turned so as to move aside the prism 10, as shown in Fig. 4, and the vessel 9 is now substituted for the prism. The beam $F^1$ falls on the said vessel and illuminates the same, so that the vessel will become a secondary source of light, and the beam issuing therefrom will proceed upon the objective 11 which now occupies the position shown in Fig. 3 in dotted lines at 11', i. e. in a position such that its focus will be situated upon the vessel 9.

The beam $F^2$ is the same as used for the measurements of absorption, or if desired, we may dispose in the path of the beam a standardized opalescent glass screen 33 (Fig. 3) and an objective 34 whose focus is situated upon the said screen. This latter becomes a secondary illuminant, and the resulting beam $F^2$ is the beam which proceeds from the said objective.

The screen 33 and the objective 34 are adjusted in position by rotating the milled head 50 disposed below the box. The remainder of the operation is as above stated.

For measurement of diffusion at angles other than 90 degrees, for instance at 20 degrees, the prism 10 and the vessel 9 are disposed as for the measurements of absorption, Fig. 5. We dispose between the prism 10 and the photometric cube 14 an objective 35 whose focus is situated upon the vessel 9, and we further dispose in the path of the beam $F^2$ and before the vessel 9 a pair of superposed mirrors 36, 37, Fig 6; the said mirrors can be replaced by a single prism. The beam $F^1$ illuminates the vessel 9, making the desired angle with the direction of observation, and in this case the said vessel becomes a secondary illuminant. The beam $F^2$ is constituted according to one of the two methods as stated for the 90 degree diffusion, and the operation is performed as above described.

Figure 8:
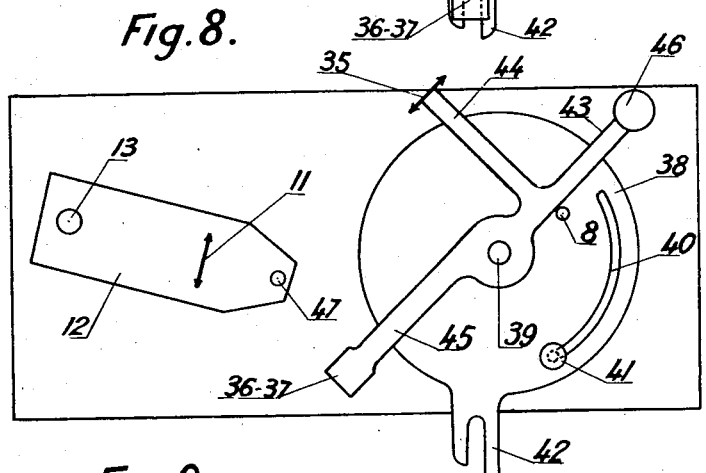
Figure 9:
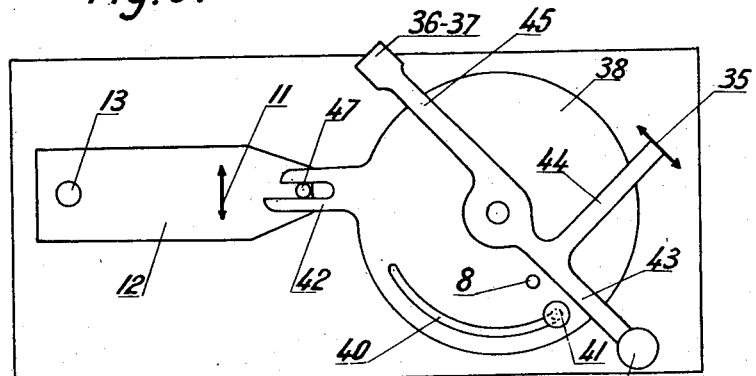

Figs. 7, 8 and 9 show an arrangement for interlocking the movements of the various elements 7, 9, 10, 11, 35, 36, 37 so that a single control knob will provide for the arrangement of the elements for any one of the three measurements as stated. For this purpose the base 7 carrying the prism 10 and the vessel 9 is connected with a disc 38 pivoting on a vertical axle 39 mounted upon the bottom of the box 4; said disc has formed therein the slot 40 extending upon a part of its surface and co-operating with a stationary pin 41 mounted upon the bottom piece 4. The disc 38 is provided with a fork 42 whose function will be further described.

Upon the axle 39 is further pivoted a star-shaped member having three points 43, 44, 45, the point 45 carries the operating knob 46 which extends outwardly of the box; the branch 44 carries the objective 35 and the branch 45 (perpendicular to 44) carries the pair of mirrors 36, 37 or the prism which is substituted for the same.

The objective 11 is mounted upon a base 12 pivoting on an axle 13 and having at the end a pin 47 co-operating with the fork 32 when the said disc is suitably rotated.

The said device is operated as follows:

In the position shown in Fig. 7, the said mirrors and the objective 35 are disposed in the path of the beam $F^1$, and the disc 38 is so disposed that the beam will fall successively upon the vessel 9 and the prism 10, so that the parts of the instrument will occupy the position corresponding to a measurement of diffusion at an angle other than 90 degrees. Upon turning the said knob to the right of the figure, the position shown in Fig. 8 will be obtained. The star-shaped member has rotated on its axle so as to turn aside the objective 35 and the said mirrors; the disc 38 has not moved, so that the said vessel and prism remain as before; thus providing for the position of the various elements as used for measurements of absorption. At this time an interlocking device connects the said star-shaped member with the said disc.

If the said knob is again turned in the same direction, it will draw with it the said disc and also the base 7, Fig. 9, and the said prism is moved aside and is replaced by the said vessel. The objective 35 and the mirrors remain inoperative. During the rotation of the disc, the fork 42 co-operates with the pin 47 of the base 12 and it actuates the said base so that the objective 11 will be placed in the path of the beam F¹. This will ensure the position of the parts as shown in Fig. 4, corresponding to measurements of diffusion at a 90 degree angle. Obviously, the device comprises various tappets (not shown) for securing the said knob in each of its three positions. From this time onward, by moving the said knob to the left, the operations can be performed in the inverse manner.

Figure 10:
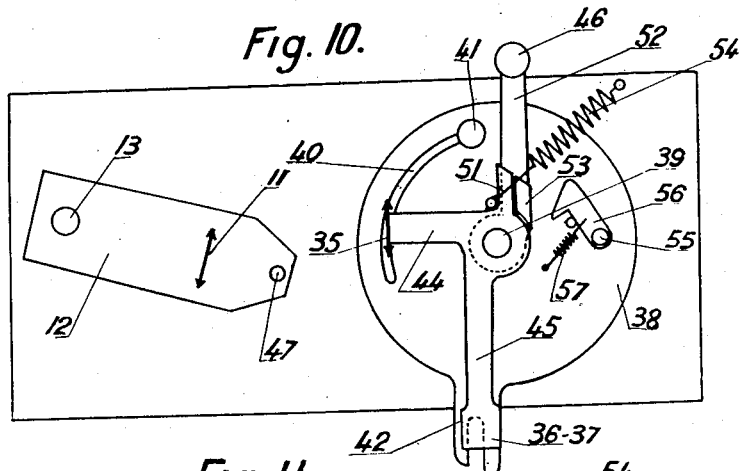
Figs. 10, 11 and 12 show a modification of said manipulating device in three different positions.
Figure 11:
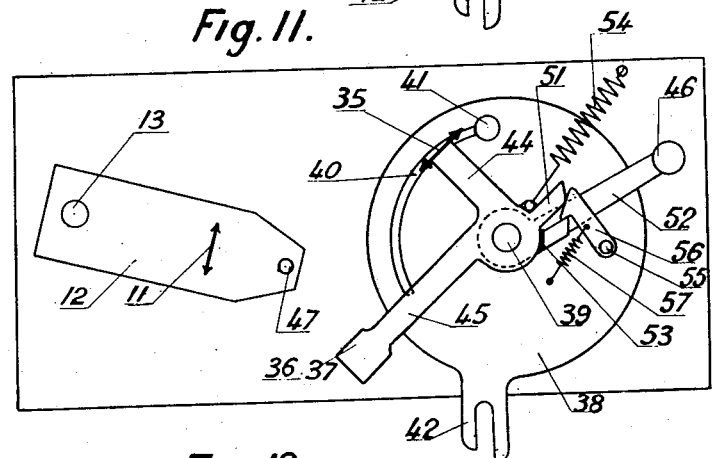
Figure 12:
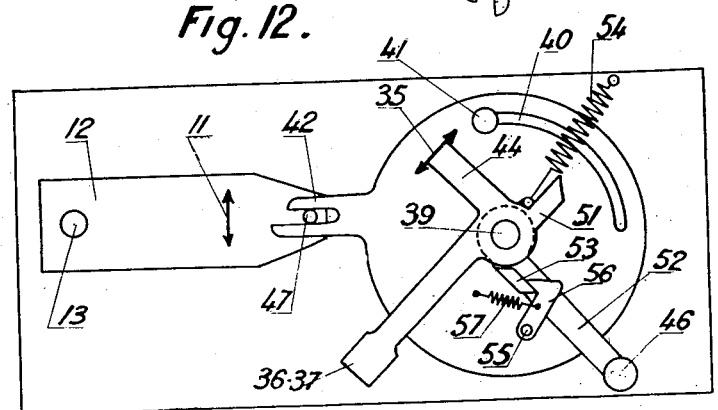

A modification of the said device is shown in Figs. 10, 11 and 12. The star-shaped member pivoting on the axle 39 comprises the arm 44 carrying the objective 35 and the arm 45 carrying the mirrors 36, 37. But the third arm 51 serves solely as an entraining tappet. The knob 46 is mounted at the end of a separate arm 52 rotating on the axle 39, and said arm is provided with a tappet 53 against which a spring 54 urges the arm of the star-shaped member 51. The disc 38 is provided with an axle 55 on which is revoluble a pawl 56 co-operating with a spring 57. The remainder of the said device is the same as shown in Figs. 7, 8 and 9.

Fig. 10 corresponds to the position of the parts for measurements of diffusion at angles other than 90 degrees. When the said knob is moved to the right, the arm 52 remains attached to the arm 51 and is independent of the disc 38; the star-shaped member alone rotates, and the device is placed in the position, Fig. 11, corresponding to measurements of absorption. At this time, the tappet 53 of the arm 52 engages the pawl 56 whilst the spring 54 no longer urges the arm 51 against the tappet 53. If therefore one continues to move the knob 46 in the same direction, it will actuate solely the disc 36 whilst the star-shaped member will remain stationary in the position corresponding to the disappearing of the elements disposed thereupon, thus attaining the position shown in Fig. 12 which corresponds to measurements of diffusion at 90 degrees.

For the various measurements for which the said apparatus is adapted, use can be made of any desired illuminant which is suited to the substance under test. Use can thus be made of white light either pure or filtered, according to the degree of purity required for the researches, and for this purpose one may dispose between the diaphragm 27 and the objective 29 of the sighting device 28 a coloured glass or gelatine screen 48. But one might substitute for the latter a device for separating the radiations, with or without graduation in wave-lengths, and to this end the diaphragm 27 is replaced by the admission slit of the separating device, and the radiation which is selected is caused to pass through an outgoing slot which can be regulated as desired. The elements following the said diaphragm are the same as above disclosed.

One might, by somewhat modifying the instrument group thus constituted and by adding various elements according to the circumstances, further proceed with observations upon illuminants (measurements of brilliancy, intensity, lighting), or relating to microphotometry, heterochromic photometry, ordinary or heterochromic spectrophotometry, polarimetry or spectro-polarimetry.

What we claim is:

1. A device for general photometry and chiefly for absorption and diffusion measurements by means of a limited number of suitably combined elements, comprising in combination an illuminant, optical means for obtaining a beam of light from said illuminant, separating means for dividing said beam into two secondary beams, an optical comparison device having a reflecting portion, and a transparent portion, means for directing both secondary beams along separate paths to the comparison device, means for observing the luminous spots formed by the two secondary beams in the comparison device, a body to be tested, means for placing the said body on the path of one of the secondary beams, a movable optical condensing device, means for placing the said condensing device on the path of the same abovementioned secondary beam so that the body to be tested, when on the path of the beam, is at the focus of said device and an optical compensator on the path of the secondary beam which does not pass through the body to be tested.

2. A device for general photometry and chiefly for absorption and diffusion measurements by means of a limited number of suitably combined elements, comprising in combination an illuminant, optical means for obtaining a beam of light from said illuminant, separating means for dividing said beam into two secondary beams, an optical comparison device having a reflecting portion and a transparent portion, mean for directing both secondary beams along separate paths to the comparison device, means for observing the luminous spots formed by the two secondary beams in the comparison device, a body to be tested, means for placing the said body on the path of one of the secondary beams, a movable optical condensing device, means for placing the said condensing device on the path of the same abovementioned secondary beam so that the body to be tested, when on the path of the beam, is at the focus of said device, two wedges of a neutral substance having the same angle at the vertex and placed on the secondary beam which does not pass through the body to be tested in inverse position, means for moving one of said wedges to vary the thickness of the virtual parallel faced element thus constituted, and means for displacing also the other wedge so as to make the correction for the zero point of the graduation of the compensator.

3. A device for general photometry and chiefly for absorption and diffusion measurements by means of a limited number of suitably combined elements comprising in combination an illuminant, optical means for obtaining a beam of light from said illuminant, separating means for dividing said beam into two secondary beams, an optical comparison device having a reflecting portion and a transparent portion, means for directing both secondary beams along separate paths to the comparison device, means for observing the luminous spots formed by the two secondary beams in the comparison device, a body to be tested, means for placing the said body on the path of one of the secondary beams, a movable device for reflecting the rays of light at an angle of 90° placed on the path of the same abovementioned secondary beam, means for substituting the said body to be tested to the movable reflecting device, a movable optical condensing device, means for placing the said condensing device on the path of the same abovementioned secondary beam so that the body to be tested, when on the path of the beam, is at the focus of said device, and an optical compensator on the path of the secondary beam which does not pass through the body to be tested.

4. A device for general photometry and chiefly for absorption and diffusion measurements by means of a limited number of suitably combined elements comprising in combination an illuminant, optical means for obtaining a beam of light from said illuminant, separating means for dividing said beam into two secondary beams, an optical comparison device having a reflecting portion and a transparent portion, means for directing both secondary beams along separate paths to the comparison device, means for observing the luminous spots formed by the two secondary beams in the comparison device, a base plate, a shaft on said base plate, a disc revoluble on said shaft and carrying the body to be tested and a device for reflecting the rays of light at an angle of 90°, a fork at the periphery of said disc, a movable optical condensing device, a pivoted plate carrying the said device, means whereby the said fork actuates the said plate, a three branch star revoluble upon the same shaft as the disc, having upon one branch an optical condensing device and upon another branch a reflecting device for deviating one of the secondary beams, a control knob which upon a portion of its path effects the movement of said star alone, and an optical compensator on the path of the other secondary beam.

In witness whereof they have hereunto set their hands in the presence of two witnesses.

ARTHUR VERNES.
ROBERT BRICQ.
MARIE LOUIS AMÉDÉE JOBIN.
GUSTAVE GEORGES JOSEPH YVON.